(12) United States Patent
Stratton

(10) Patent No.: US 7,779,947 B2
(45) Date of Patent: Aug. 24, 2010

(54) ACCELERATION BASED AUTOMATED SLIP CONTROL SYSTEM

(75) Inventor: Kenneth L. Stratton, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 505 days.

(21) Appl. No.: 11/700,193

(22) Filed: Jan. 31, 2007

(65) Prior Publication Data
US 2008/0179124 A1  Jul. 31, 2008

(51) Int. Cl.
*B60K 41/02* (2006.01)
(52) U.S. Cl. .......................... 180/197; 180/9.1; 701/90
(58) Field of Classification Search ................ 180/197, 180/9.1; 701/82, 83, 84, 85, 86, 87, 90
See application file for complete search history.

(56) References Cited

U.S. PATENT DOCUMENTS

| | | | | |
|---|---|---|---|---|
| 4,850,249 A * | 7/1989 | Kirstein | ....................... | 477/97 |
| 5,183,127 A | 2/1993 | Kageyama et al. | | |
| 5,219,411 A | 6/1993 | Yamamoto et al. | | |
| 5,819,866 A * | 10/1998 | Smith et al. | ................. | 180/197 |
| 6,182,002 B1 * | 1/2001 | Bauerle et al. | ................ | 701/82 |
| 6,230,092 B1 | 5/2001 | Becker et al. | | |
| 6,314,342 B1 | 11/2001 | Kramer et al. | | |
| 6,321,866 B1 | 11/2001 | Prohaska | | |
| 6,374,171 B2 * | 4/2002 | Weiberle et al. | .............. | 701/71 |
| 6,401,853 B1 * | 6/2002 | Turski et al. | ................ | 180/197 |
| 6,412,886 B1 | 7/2002 | Abe et al. | | |
| 6,460,647 B1 | 10/2002 | Schmitt | | |
| 6,589,135 B2 * | 7/2003 | Miller | ........................ | 477/110 |
| 6,799,652 B2 | 10/2004 | Nissen et al. | | |
| 6,909,959 B2 | 6/2005 | Hallowell | | |
| 7,092,808 B2 * | 8/2006 | Lu et al. | ....................... | 701/70 |
| 7,239,949 B2 * | 7/2007 | Lu et al. | ....................... | 701/45 |
| 7,363,138 B2 * | 4/2008 | Scelers et al. | ................. | 701/82 |
| 7,451,032 B2 * | 11/2008 | Brown et al. | .................. | 701/70 |
| 7,480,547 B2 * | 1/2009 | Brown et al. | ................... | 701/1 |
| 2003/0229439 A1 | 12/2003 | Polzin | | |

FOREIGN PATENT DOCUMENTS

| | | |
|---|---|---|
| DE | 195 45 013 | 6/1997 |
| DE | 195 49 083 | 7/1997 |
| EP | 0 315 352 | 5/1989 |
| GB | 2 188 996 | 10/1987 |
| GB | 2388348 A | 12/2003 |
| JP | 03047444 A | 2/1991 |
| WO | WO 2004/067307 A1 | 8/2004 |

* cited by examiner

*Primary Examiner*—Kevin Hurley
(74) *Attorney, Agent, or Firm*—Finnegan, Henderson, Farabow, Garrett & Dunner

(57) ABSTRACT

A system for controlling slip of a machine is disclosed. The system has a power source configured to produce a power output, at least one driven traction device, and a transmission operably connected to transmit the power output from the power source to the at least one driven traction device. The system further has at least one sensor configured to detect an acceleration of the machine and to generate a corresponding signal, and a controller configured to receive the signal and to reduce a magnitude of power or torque transmitted to the at least one driven traction device when the detected acceleration indicates slip of the at least one driven traction device.

9 Claims, 3 Drawing Sheets

ACCELERATION BASED AUTOMATED SLIP CONTROL SYSTEM

TECHNICAL FIELD

This invention relates generally to a system for controlling slip of a machine and, more particularly, to a system for automatically controlling slip based on a detected acceleration.

BACKGROUND

Machines such as, for example, wheel loaders, motor graders, dump trucks, and other types of heavy machinery are used for a variety of tasks. These machines generally include a power source, which may be, for example, an engine, such as a diesel engine, gasoline engine, or gaseous fuel-powered engine that provides the power required to complete the tasks. To efficiently perform these tasks, the machines utilize a transmission that is capable of transmitting the torque generated by the engine over a wide range of speeds. The transmission may include, for example, a mechanical transmission, an electric transmission, or a hydraulic transmission. These transmissions may be capable of providing a desired output torque at a desired speed within its operating range by changing a ratio of the transmission.

The machines also typically include traction devices driven by the transmission to engage the ground in order to impart horizontal driving motion to the machine. In certain machines, known as "track-type tractors" or "crawlers", the driven traction devices include one or more tracks driven by a sprocket assembly of the machine. Under normal operation, these tracks are preferably in power-transmitting engagement with the ground. However, in some situations such as loading, unloading, uneven loading, or traveling over inconsistent, inclined, or soft or loose terrain, it may be possible for the driven traction devices to slip or move faster than a traveling speed of the machine. Slipping can decrease the efficiency of the machine, increase wear of the tracks, decrease life of the drive train components (e.g., engine, transmission, sprockets, etc.), and possibly result in unexpected or undesired movement of the machine.

Traditionally, slip of machine driven traction devices has been addressed by determining that slip is occurring and then reducing a torque applied to the tracks. For example, U.S. Pat. No. 6,799,652 (the '652 patent) issued to Nissen et al. on Oct. 5, 2004 discloses a method of reducing slip of a driving wheel of an industrial truck. The method includes comparing a circumferential measured speed of the wheel to a set point and calculating slip based on the comparison. If slip is occurring, the torque applied to a driving motor of the industrial truck is reduced. In this manner, wear of the truck may be minimized and efficiency increased.

Although the method of the '652 patent may minimize wheel slip, the manner in which it detects slip may be complex and unreliable. In particular, because the method minimizes slip by measuring a speed and performing calculations, the process may be complicated and time consuming. Moreover, because the method requires the implementation of expensive sensing equipment in locations vulnerable to damage, it may be susceptible to malfunction.

The present disclosure is directed towards overcoming one or more of the problems as set forth above.

SUMMARY OF THE INVENTION

In accordance with one aspect, the present invention is directed toward a system for controlling slip of a machine. The system includes a power source configured to produce a power output, at least one driven traction device, and a transmission operably connected to transmit the power output from the power source to the at least one driven traction device. The system further includes at least one sensor configured to detect an acceleration of the machine and to generate a corresponding signal, as well as a controller configured to receive the signal and to reduce a magnitude of power or torque transmitted to the at least one driven traction device when the detected acceleration indicates slip of the at least one driven traction device.

According to another aspect, the present invention is directed toward a method of controlling slip of a machine. The method includes imparting force to propel the machine. The method further includes detecting an acceleration of the machine corresponding to tractive slip of the machine. The method also includes reducing a magnitude of the imparted force in response to the detection.

DETAILED DESCRIPTION

Figure 1:
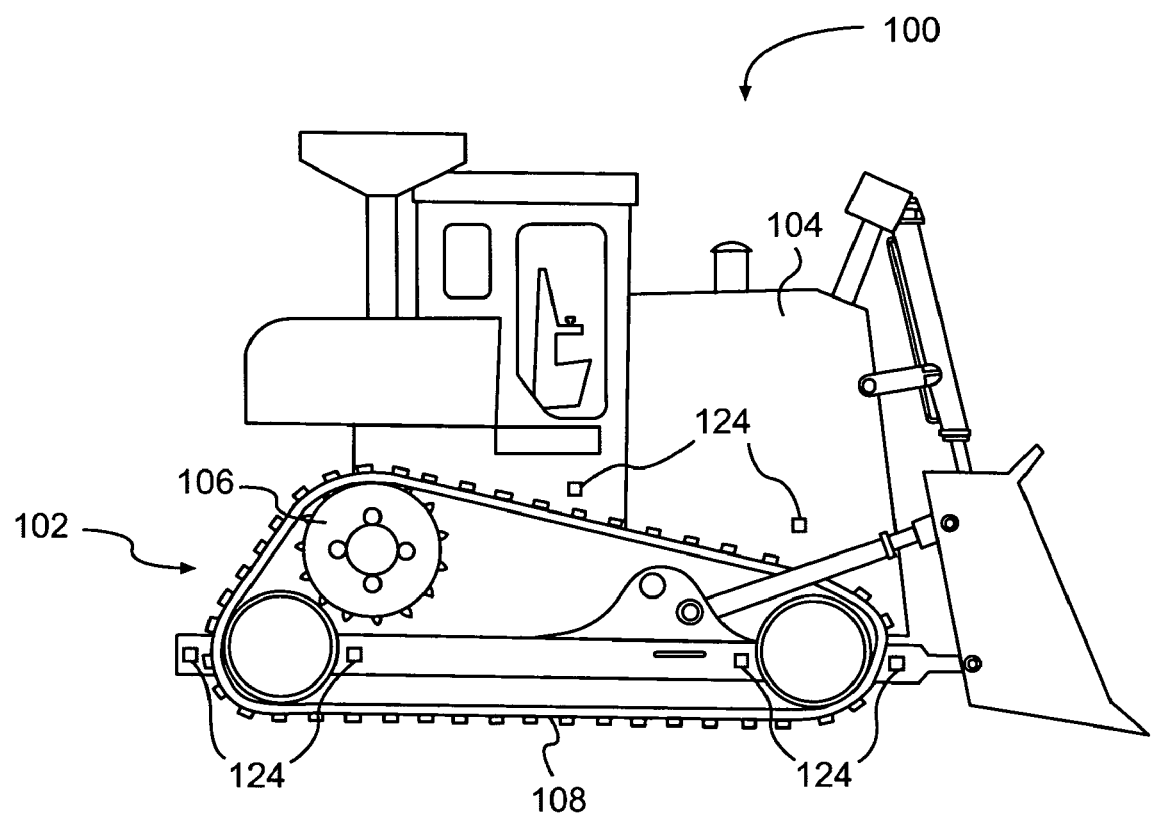
FIG. 1 is a pictorial illustration of an exemplary disclosed machine.

FIG. 1 illustrates an exemplary embodiment of a machine 100 having a drive system 102. Machine 100 may be a mobile machine that performs some type of operation associated with an industry such as mining, construction, farming, transportation, or any other industry known in the art. For example, machine 100 may be an earth moving machine such as a wheel loader, a dump truck, a backhoe, a motor grader, or any other suitable operation-performing machine. More specifically, machine 100 may be what is commonly referred to as a "track-type tractor", a "crawler", or any other mobile machine susceptible to tractive slipping. Drive system 102 of machine 100 may include tracks 108 driven by a power source 104 to engage the ground in order to impart horizontal driving motion to machine 100.

As illustrated in the embodiment of FIG. 1, tracks 108 of machine 100 may be driven by engagement with sprockets 106. Sprockets 106 may be connected to independently transmit a torque from power source 104 to a ground surface via tracks 108 in a direction opposite a desired direction of travel. It is further contemplated that traction for machine 100 may be achieved via tires, over-tire tracks, belts, or any other traction devices known in the art.

Power source 104 may produce a power output that is directed to drive tracks 108. Power source 104 of machine 100 may include an internal combustion engine such as, for example, a diesel engine, a gasoline engine, a gaseous fuel-powered engine such as a natural gas engine, or any other engine apparent to one skilled in the art. Power source 104 may alternatively include a non-combustion source of power such as a furnace, a battery, a fuel cell, a motor, or any other appropriate source of power. A power output from power source 104 may be varied (i.e., reduced) by any method known in the art such as, for example, a reduction in fueling, a reduction in air supply, or a change in ignition timing.

Figure 2:
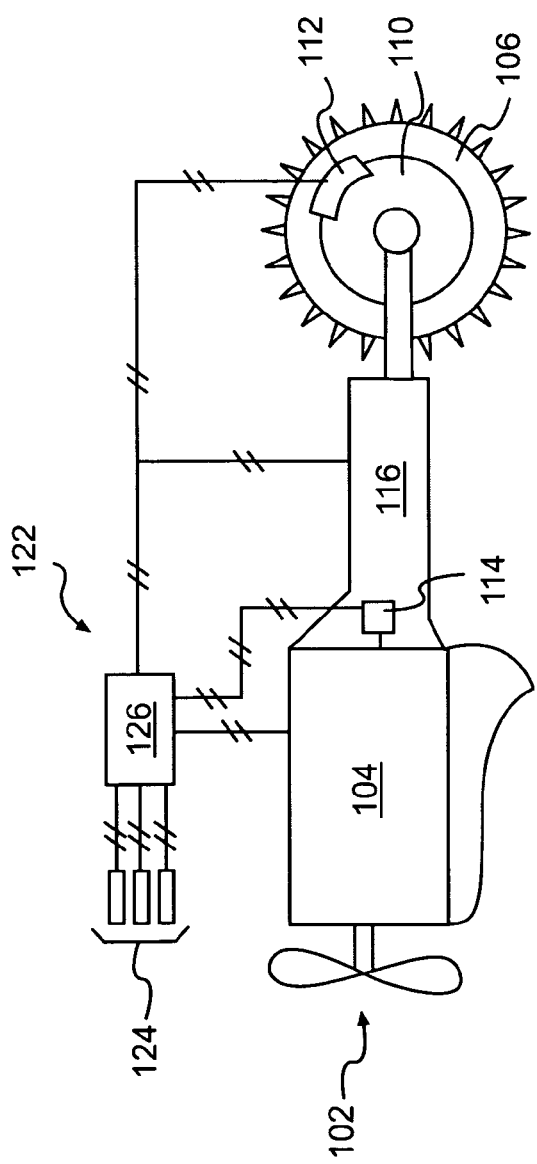
FIG. 2 is a diagrammatic illustration of exemplary drive and control systems for the machine of FIG. 1.

As illustrated in FIG. 2, drive system 102 of machine 100 may include components that cooperate to connect power source 104 to sprockets 106. In particular, a mechanical step-change transmission 116 of machine 100 may transmit output power from power source 104 to tracks 108 via sprockets 106 at a range of discrete output speed ratios. Accordingly, mechanical transmission 116 may vary (i.e., reduce) the magnitude of torque transmitted to tracks 108 such as by switching from a low output gear ratio to a higher output gear ratio.

A torque converter 114 may couple power source 104 to mechanical transmission 116. Torque converter 114 may allow power source 104 to rotate somewhat independently of the transmission. The amount of independent rotation between power source 104 and transmission 116 may be directly proportional to the amount of torque transmitted from power source 104 to transmission 116 and may be varied (i.e., reduced) by modifying the operation of torque converter 114. It is contemplated that torque converter 114 may embody either a hydraulic device, such as a pair of opposing impellers, or a non-hydraulic device, such as a mechanical diaphragm clutch. It is further contemplated that torque converter 114 may be omitted, if desired, and the transmission connected directly to power source 104.

One or more brake mechanisms 112 may also be associated with tracks 108 in order to reduce a magnitude of power transmitted to tracks 108 of machine 100. In one embodiment, each brake mechanism 112 may include a hydraulic pressure-actuated wheel brake such as, for example, a disk brake or a drum brake disposed proximate to sprocket 106. For example, as illustrated in FIG. 2, brake mechanism 112 may be operatively associated with a disk 110 fixedly connected to sprocket 106. Brake mechanism 112 may be manually operated using a brake pedal (not shown), which in turn may direct pressurized fluid to brake mechanism 112. A degree of brake pedal actuation may proportionally control a pressure of the fluid supplied to brake mechanism 112. Brake mechanism 112 may also be automatically operated in response to an electronic signal. It is contemplated that the brake mechanism may alternatively be pneumatically actuated, mechanically actuated, or actuated in any other manner known in the art.

Machine 100 may be further provided with a control system 122 configured to monitor and direct operation of drive system 102 in response to signals generated by one or more sensors 124. As illustrated in the embodiment of FIG. 1, sensors 124 may be disposed at multiple locations on machine 100 depending on the type and location of the desired data measured by sensors 124. Sensors 124 may generate signals to communicate the data received at their respective locations. Moreover, sensors 124 may capture data points at sufficiently short intervals to provide real-time feedback on the motion of machine 100.

In one embodiment, sensors 124 may be accelerometers configured to detect acceleration of machine 100, and more particularly, to detect vertical acceleration of machine 100. Vertical acceleration, for the purposes of this disclosure, may be considered the acceleration of machine 100 in a direction substantially normal to a general work surface on which machine 100 is operating. The accelerometers may be advantageously configured to isolate vertical components of acceleration vectors detected at locations of interest on machine 100 in order to determine vertical vibration characteristics. For example, accelerometers may be incorporated into the undercarriage, frame, drive shaft, and/or operator cabin of machine 100 in order to acquire overall vertical vibration measurements of machine 100. Alternatively, accelerometers may be located on machine 100 proximate to tracks 108 in order to acquire vibration data specific to each track 108. Any number of sensors 124 may be utilized at any suitable location(s) on machine 100. In an alternate embodiment of machine 100, such as in a hydraulic excavator that is capable of swinging about a vertical pivot axle, one or more accelerometers may be located on the pivot axle.

As illustrated in FIG. 2, control system 122 may further include a controller 126 in communication with sensors 124, power source 104, torque converter 114, mechanical transmission 116, and/or brake mechanism 112. Controller 126 may be in communication with components of drive system 102 and/or with sensors 124 via digital, analog, or mixed types of communication lines. Alternatively, communication may be implemented by means of wireless communication, or by mechanical or hydraulic connections. It is further contemplated that controller 126 may be in communication with other components of machine 100.

Controller 126 may embody in a single microprocessor or multiple microprocessors that include a means for controlling an operation of machine 100. Numerous commercially available microprocessors may perform the functions of controller 126. It should be appreciated that controller 126 could readily embody a general machine microprocessor capable of controlling numerous machine functions. Various other known circuits may be associated with controller 126, including power supply circuitry, signal-conditioning circuitry, solenoid driver circuitry, communication circuitry, and other appropriate circuitry.

Controller 126 may include, or be associated with, a memory for storing data such as, for example, an operating condition, design limit, and performance characteristic or specification of machine 100. In particular, controller 126 may include a memory for storing one or more predetermined thresholds of vertical acceleration, above which slip of machine 100 may be known to occur. That is, vertical vibration of machine 100 may be known to occur, for example, when tracks 108 of machine 100 slip in relation to the ground surface. That is, as tracks 108 slip, grab, and slip again, the machine may be jerked up and down relative to the ground surface. This jerking motion may be experienced and measured as vertical acceleration. Accordingly, a detected vertical acceleration of machine 100 (i.e., an acceleration in the direction substantially normal to the work surface on which machine 100 is operating) may reliably indicate the incidence of a vehicle "hopping" condition (i.e., track-slip induced vibration of machine 100).

Upon a determination of track slip, via detection of a "hopping" condition, a power reduction signal may be generated by controller 126 in order to slow tracks 108 by a magnitude sufficient to minimize, or altogether eliminate, slip and associated vertical acceleration of machine 100. Controller 126 may generate a power reduction signal until the detected acceleration is below the one or more predetermined thresholds stored in the memory of controller 126.

Controller 126 may, if desired, vary or adjust the one or more predetermined thresholds in response to an operational parameter, a physical machine characteristic, and/or an observed or measured ground condition. In one embodiment, one or more maps relating parameters such as, for example, the age of machine 100; an estimated wear on tracks 108; a loading condition of tracks 108; a load and/or load distribution on a work implement of machine 100; a load generated by the presence of fluid in machine 100; an incline of machine 100; known ground conditions; the experience of the operator; physical specifications of machine 100; a type of tool attachment and/or other known parameters may be stored within the memory of controller 126. Each of these maps may be in the form of tables, graphs, and/or equations and include a compilation of data collected from lab and/or field operation of machine 100. Controller 126 may reference one or more of these maps in order to determine a modification value that should be applied to the predetermined threshold for a given operating condition of machine 100.

Figure 3:
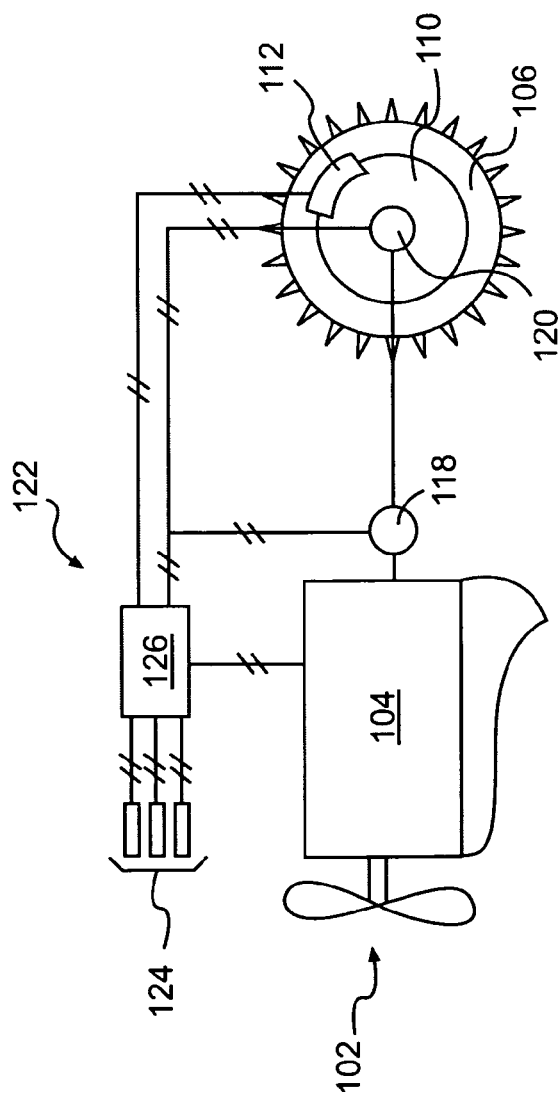
FIG. 3 is a diagrammatic illustration of additional exemplary drive and control systems for the machine of FIG. 1; and, FIG. 4 is a flowchart of an exemplary method of operating the driving and control systems of FIGS. 2 and 3.

Referring now to FIG. 3, an alternate embodiment of the present disclosure is illustrated wherein the transmission of drive system 102 may be either a hydraulic transmission or an electric transmission. A hydraulic transmission may include a hydraulic pump 118 drivably associated with power source 104, as well as a hydraulic motor 120 drivingly associated with sprockets 106. Hydraulic pump 118 may be fluidly connected to power hydraulic motor 120. In order to vary (i.e., reduce) a torque transmitted to tracks 108 via sprockets 106, controller 126 may generate a signal instructing a change in the displacement of at least one of hydraulic pump 118 and hydraulic motor 120. For example, a decreased displacement of pump 118 or an increased displacement of motor 120 may result in decreased torque output. Alternatively, still referring to FIG. 3, an electric transmission may include an electric generator 118 drivably associated with power source 104, as well as an electric motor 120 drivingly associated with sprockets 106. Electric generator 118 may be in electrical communication with electric motor 120 to power electric motor 120. In order to reduce the torque transmitted to tracks 108 via sprockets 106, controller 126 may generate a signal instructing a change (i.e., reduction) in current supplied from electric generator 118 to electric motor 120.

Figure 4:
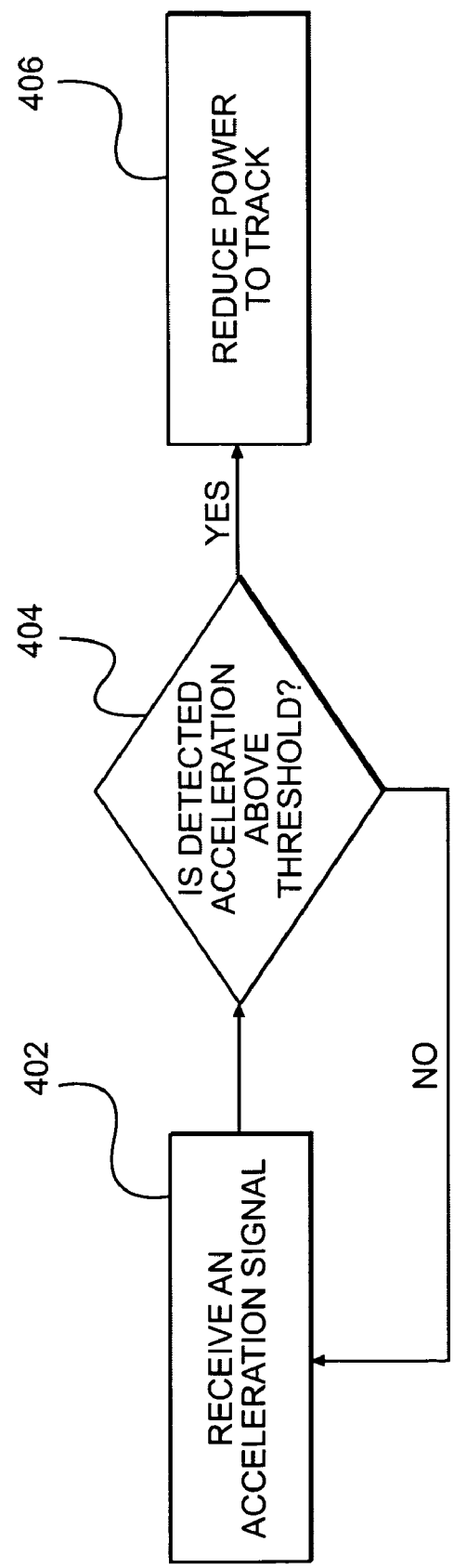

Referring now to FIG. 4, a flowchart is shown illustrating one embodiment of a method for controlling slip of machine 100. FIG. 4 will be described in the following section to better illustrate the disclosed system.

INDUSTRIAL APPLICABILITY

The disclosed system finds potential application in any mobile machine where it is desirable to reliably minimize tractive slip while protecting the components of an associated drive system. In particular, the disclosed system may detect and act to minimize vertical acceleration, which is directly linked to slip. As a result of minimizing vertical acceleration, component and track wear caused by track slip may be reduced. Operation of machine 100 will now be described.

Referring now to FIG. 4, during operation of machine 100, controller 126 may receive one or more signals from sensors 124 including, for example, a value of acceleration corresponding to the location of each sensor 124 (step 402). In one embodiment, the acceleration components detected by sensors 124 may be limited to detecting only vertical acceleration. The signals may be generated based on the detected acceleration and communicated to controller 126. Controller 126 may then compare the acceleration values to one or more predetermined thresholds of acceleration (step 404).

Upon a determination that the detected acceleration is severe enough to correspond with "hopping", or machine slip, a magnitude of power or torque transmitted to tracks 108 may be selectively reduced (step 406). Controller 126 may cause the reduction by controllably decreasing an output of power source 104, by decreasing an output of transmission 116 or torque converter 114, and/or by actuating brake mechanism 112. Referring to FIG. 2, the power output of power source 104 may be decreased by a reduction in fueling, a reduction in air supply, or a change in ignition timing. The torque output of mechanical transmission 116 may be reduced by switching to a higher output gear ratio. The power and/or torque output of a hydraulic transmission may be reduced by adjusting the displacement of either one or both of hydraulic motor 118 and hydraulic pump 120. Alternatively, the output of an electric transmission may be reduced by adjusting the current provided by electric generator 118 to electric motor 120. Additionally, the power output may be reduced by actuating brake mechanism 112 so as to absorb and convert some portion of the power to heat.

Because the present disclosure may minimize track slip, the inefficiencies and component wear associated with such slipping may be substantially reduced or even eliminated. Furthermore, because the present system limits the magnitude of power and/or torque transmitted to the machine tracks in response to a detected vertical acceleration, the need for complex and unreliable complications may be obviated. That is, the robust ability of the present system to detect track slip through the measurement of vertical acceleration may provide the components of machine 100 with a longer life, as compared to traditional systems. In particular, sensors 124 may be located at positions of machine 100 shielded from potential vibrational and impact damage. Accordingly, a decrease in tractive slip may reduce the undesirable wear of tracks 108, whereas a decrease in slip-induced vibrations may result in a reduction of vibration-induced wear to undercarriage and drive train components. Finally, the present disclosure minimizes those fuel and workforce inefficiencies caused by slip-induced vibration.

It will be apparent to those skilled in the art that various modifications and variations can be made to the control system of the present disclosure. Other embodiments of the control system will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A system for controlling slip of a machine, the system comprising:
    a power source disposed on the machine and configured to produce a power output;
    at least one driven traction device;
    an electric transmission operably connected to transmit the power output from the power source to the at least one driven traction device;
    at least one sensor disposed on the machine and configured to detect an acceleration of the machine and to generate a corresponding signal; and
    a controller disposed on the machine and configured to receive the signal and to reduce a magnitude of power transmitted to the at least one driven traction device, when the detected acceleration indicates slip of the at least one driven traction device, by limiting current to an electric motor associated with the electric transmission.

2. The system of claim 1, wherein the detected acceleration is in a direction substantially normal to a work surface on which the machine is operating.

3. The system of claim 1, wherein the magnitude of power transmitted to the at least one driven traction device is further reduced by decreasing an output of the power source.

4. The system of claim 1, further including a braking mechanism connected to the at least one driven traction device, wherein the magnitude of power transmitted to the at least one driven traction device is further reduced by actuating the braking mechanism.

5. A system for controlling slip of a machine, the system comprising:
- a power source disposed on the machine and configured to produce a power output;
- at least one driven traction device;
- a transmission operably connected to transmit the power output from the power source to the at least one driven traction device;
- at least one sensor disposed on the machine and configured to detect an acceleration of the machine and to generate a corresponding signal; and
- a controller disposed on the machine and configured to receive the signal and to reduce a magnitude of power transmitted to the at least one driven traction device when the detected acceleration indicates slip of the at least one driven traction device;
- wherein the controller is configured to compare the signal to a predetermined threshold that varies in response to at least one of a machine operational parameter, a physical machine characteristic, and a ground condition.

6. A machine, comprising:
- a power source disposed on the machine and configured to produce a power output;
- a work implement driven by the power source;
- at least one driven traction device;
- an electric transmission operably connected to transmit power from the power source to the at least one driven traction device;
- at least one sensor is disposed on the machine and configured to detect an acceleration of the machine and to generate a corresponding signal; and
- a controller disposed on the machine and configured to receive the signal and to reduce a magnitude of power transmitted to the at least one driven traction device, when the detected acceleration indicates slip of the at least one driven traction device, by limiting current to an electric motor associated with the electric transmission.

7. The machine of claim 6, wherein the detected acceleration is in a direction substantially normal to a work surface on which the machine is operating.

8. The machine of claim 6, wherein the magnitude of power transmitted to the at least one driven traction device is further reduced by decreasing an output of the power source.

9. The machine of claim 6, further including a braking mechanism connected to the at least one driven traction device, wherein the magnitude of power transmitted to the at least one driven traction device is further reduced by actuating the braking mechanism.

* * * * *